Oct. 6, 1959 D. D. DOERR 2,907,417
FLOOR CONSTRUCTION
Filed Jan. 30, 1957
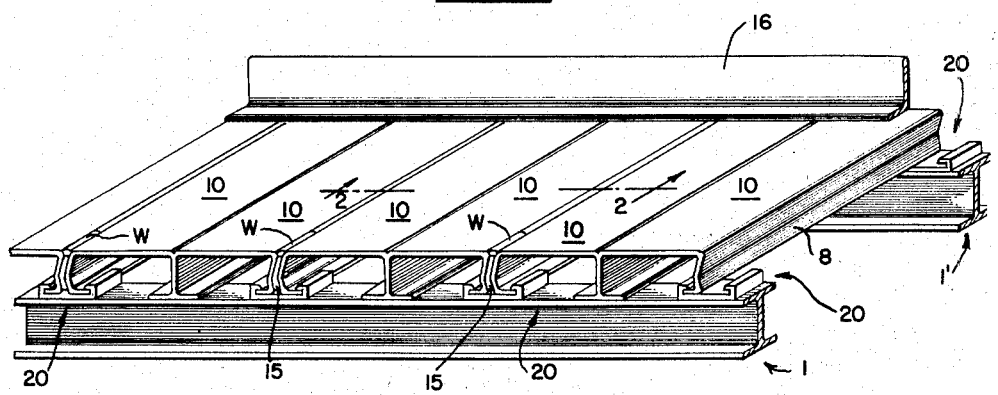
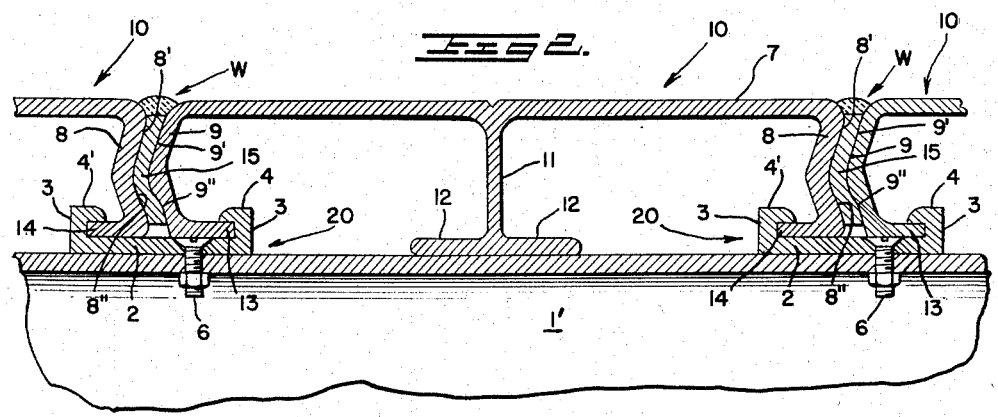
INVENTOR
DALE D. DOERR
BY *James E. Tooney*
ATTORNEY

United States Patent Office 2,907,417
Patented Oct. 6, 1959

2,907,417

FLOOR CONSTRUCTION

Dale D. Doerr, Palos Park, Ill., assignor to Kaiser Aluminum & Chemical Corporation, Oakland, Calif., a corporation of Delaware Application January 30, 1957, Serial No. 637,180

2 Claims. (Cl. 189—34)

This invention relates to floor structures. In particular, the invention relates to metallic floor structures anchored in a unique fashion to a series of supports, wherein provision is also made in the structure for the use of suitable fastener elements for tying down the cargo or the load carried on the floor. Thus, while the floor structure herein described is readily adaptable for general utility, it finds particular use in vehicles, such as railway rolling stock, closed-body trucks and semi-trailers.

The use of metallic floor sections which produce a floor area of exceptional rigidity and strength in and of itself is not new. However, in all such applications of metallic flooring, difficulties have been experienced in providing suitable arrangements, whereby the cargo carried on such flooring may be fixed relative to the floor structure. This situation exists in all installations, wherein metallic flooring may find utility. It is exaggerated, when such floor structures are utilized in a moving vehicle such as a railroad car or the like because constant acceleration and deceleration of the vehicle tends to shift the cargo with resultant damage thereto unless some adequate means is provided whereby the cargo may be anchored with respect to the floor structure and hence with respect to the vehicle.

The instant invention deals with a metallic flooring arrangement comprised of a plurality of identically configured, easily fabricated light metal planks so arranged as to provide recesses coextensive with their longitudinal extent into which suitable fastening elements may be fixed. The invention further contemplates a simple yet highly effective arrangement whereby, not only may the above mentioned result be obtained, but also the installation and fixing of the individual planks to a suitable, supporting under-frame assures proper positioning of the planks to permit insertion of suitable fasteners through the mentioned longitudinal recesses.

Accordingly, an object of the invention is to provide a floor structure which is anchored in a unique fashion to a series of supports.

A further object of the invention is to provide a floor structure wherein cargo or the like carried thereon may be fastened to the structure.

Still a further object of the invention is to provide a metallic floor structure which may be installed easily and in which the fastening feature mentioned above may be incorporated with a minimum of effort even where close tolerances exist.

Another object of the invention is to provide a metallic floor area or structure, wherein the means for anchoring the floor structure to its supporting sub-structure is also effective to provide an arrangement whereby fastening elements may pass through the metallic floor area.

An additional object of the invention is to provide a metallic floor structure which requires no special installation and which is capable of utility in a variety of vehicles, buildings and the like under conditions in which the use of other than a metallic flooring would result in expensive maintenance.

The above mentioned objects of the invention may be accomplished by providing a floor structure comprised of a plurality of extruded sections each of which has a flat area defining cargo receiving upper surfaces and depending angularly disposed walls paralleling each other. These walls terminate in suitable flanges or the like which are forced into interengagement with each other through the medium of suitable clip elements. The positioning of the angularly disposed walls on adjacent extruded sections is also such that a sinuous slot is formed into which a fastening means may be passed and retained. The proper spacing to permit entry of a fastener element between the respective cooperating walls is assured by the use of wedges, which serve not only to maintain the walls in properly spaced relation, one with respect to the other but also to anchor or lock the adjacent extruded elements to the desired support structure.

These and other objects inherent in the instant invention will be more readily understood when consideration is given to the following detailed description and attached drawings, wherein:

Figure 1 is a perspective view of the floor construction of the instant invention with parts thereof being removed for the sake of clarity, Figure 2 is a sectional view through the floor structure shown in Figure 1, when taken along the line 2—2 thereof, and Figure 3 is a view showing the application of a representative fastening means.

Considering more specifically Figure 1, there is shown a typical support arrangement which may be utilized in carrying out the instant invention. The subframe may consist, by way of example, of a pair of spaced parallel I-beam sections 1, 1' with the flanges of the respective I-beams being in coplanar relationship one with respect to the other. To the top flanges of the I-beams are fixed a plurality of channel-shaped clip members 20 having a cross-sectional configuration as shown in Figure 2. Each clip comprises a base 2 adapted to rest on the top horizontal flange of the support members 1, 1' and a pair of parallel vertically disposed walls 3 which terminate in small inwardly-turned lips 4 and 4'. The base 2 of each clip is provided with a series of apertures through which, as is shown clearly in Figure 2, there may be passed suitable fastener elements 6 such as rivets, bolts, screws, or the like, which serve to anchor the clips to the underframe support members 1. It will be appreciated that the heads of the fastener elements would be countersunk in such a manner that the inner and upper planar surface of the base 2 between walls 3 is uninterrupted.

Referring briefly to Figure 1, it may be seen that a series of identically configured floor planks 10 are applied over and extend between the respective support members 1 and 1'. Each of these members 10 is preferably comprised of a light metal such as, for example, aluminum. It may also be and preferably is an extruded shape or element including a planar upper surface 7 and spaced pairs of downwardly and generally vertically disposed oppositely facing trough-shaped walls 8 and 9. The walls 8 and 9 are complementary and are coterminus with the greatest longitudinal extent of the elongated plank-like extrusions 10. Intermediate spaced walls 8 and 9 and extending generally parallel thereto is an integral reinforcing element comprised of a vertical web 11 terminating in a flange or foot element 12 which is parallel to the upper surface 7. This reinforcing flange member serves to prevent flexure of the top surfaces 7 of the planks intermediate spaced vertical walls 8 and 9.

The generally vertically disposed walls 8 and 9 are actually comprised of a plurality of angularly-positioned surfaces 8' and 8" and 9', 9" and are so interconnected as to define generally concave and convex outer surfaces, the wall 9 having a convex configuration and the wall 8 being of generally complementary shaped, concave configuration. Each of the walls 8 and 9 is provided with coterminus and inwardly facing flange elements 13 and 14. These flange elements are coplanar and differ only in that the flange 14 carried by wall 8 does not extend inwardly a distance equal to the inward projection of the flange 13 carried by the wall 9. It is to be further noted that the flanges 13 and 14 are vertically spaced above the flange or foot reinforcing member 12, the vertical spacing between the flanges and central foot being equal to the vertical dimensional thickness of the web or base portion 2 of the clips 20 against which the flanges 13 and 14 rest as shown in Figure 1. In other words, the bottom of support 12 lies in a plane below the plane of the planar flanges of the floor member.

Referring now to Figure 1, it may be seen that the flange portions 13 and 14 of two adjacent floor elements are adapted to be engaged beneath the inwardly projecting lips 4, 4' of a pair of laterally positioned clip elements 20 in such a manner as to preclude vertical movement of the individual floor sections 10 with respect to the clip 20, to each other and hence the support members 1 and 1'. It will also be apparent that limited horizontal movement of the sections 10 within a given clip is provided to enable proper assembly of the structure shown in Figure 1 in the manner which will be subsequently described.

Referring now to Figures 1 and 2 the manner in which the floor structure is laid will be described. Initially a pair of clips 20 is laid on and fixed to supports 1 and 1' by suitable bolts or other fastening means 6 as shown. A first plank 10 is then engaged with these clips 20 and wall flange 13 fitted into its proper position beneath the respective lips 4. Then a second pair of clips 20 is laid on supports 1 and 1' and properly engaged with the flange 14 of this plank. By means of a suitable pry bar or other lever flange 14 can be forced into further engagement with the lips 4' of the clips 20. Another pair of clips 20 is then fastened to the supports 1 and 1' again by suitable bolt or other fastening means 6. With the first of a series of planks 10 being securely locked in place, the next adjacent plank is then butted against the longitudinal face 8 of the fixed plank and slipped into clips 20 and its flange 13 locked beneath the lip 4. At this point one or more generally flat surfaced wedge-like elements 15 are driven between the planks 10 so as to lock the second laid plank in the fixed pair of clips 20. The wedge elements are also of such a length and sufficiently spaced from each other to provide openings therebetween. This process is repeated for each plank 10 until the area to be floored is completely covered. It will also be observed that the wedge elements are advantageously disposed below the level of the load bearing surfaces of the floor members 10 such that the floor members will present unobstructed load bearing surfaces.

Referring now in particular to the wedge-like elements 15 it is essential to note that each of these wedge-like members is formed of a metallic alloy having properties such that the wedge may be driven between and deformed by the registered walls 8 and 9 of adjacent planks 10 while at the same time the wedging action of the wedge 15 will suffice to force the adjacent plank members apart. Thus, adjacent planks are forced into positive engagement beneath the lips 4, 4' of clips 20 and are fixed relative to each other such that the spacing between the adjacent and registered concave and convex walls 8 and 9 will be of the desired dimension.

It may be seen that the wedge members 15 are used to effect three separate and distinct functions. The wedge members act in the first instance to lock the respective planks 10 to clips 20, and thus are effective as a means for locking the planks to the underframe, such as members 1 and 1'. Secondly, the wedge members 15 serve to assure the proper spacing between the adjacent planks so that a cargo tie down fastener F, such as a nail, screw or the like may be inserted between the respective planks and the wedge elements 15 as shown in Figure 3 and because of the sinuous path defined by the walls 8 and 9 of adjacent planks 10 the fastener F will be locked into firm engagement between the walls. Thirdly, "the wedges 15 act as a stop-weld." That is when a suitable weld W is formed between the planks 10 adjacent the wedges 15 the weld filler material will ordinarily be applied over the top of the wedges 15 and the wedges 15 will act to prevent the flow of the weld material between the planks. This latter arrangement facilitates ready removal of a plank should it become worn since it is quite easy to destroy the relatively shallow weld bead and remove the wedge in contradistinction to the situation that would exist were the weld to extend to the full depth of the planks.

A suitable mastic sealer M may also be used to fill the space between adjacent planks and wedges 15 as indicated in Figure 3.

Such a mastic would be preferably "self-sealing" so as to close holes therein, as, for example, if fastener F were removed.

If desired, and as shown in Figure 1, there may be provided an angle member 16, preferably an equal angle, which could be applied to the tops of the sections 10 around the sides of a container or vehicle wall. These angles serve to define a marginal closure member by effecting a smooth transition between wall and floor structure. Thus an angle member 16 such as is shown in Figure 1 would extend transversely of the greatest longitudinal dimension of the individual planks 10.

It will be readily apparent that there is disclosed herein a new conception in a metallic floor. The unit formed by the use of the above disclosure results in a load carrying floor that is strong and which may be readily installed without the necessity of special tools or without resorting to complicated dimensional calculations, and which permits the ready use of cargo fastening means between the floor planks such that a cargo may be easily fastened to the floor. It will be apparent, too, that reasonable variations in construction would fall within the purview of the instant invention, limited only to the extent as defined in the following claims wherein, what is claimed is:

1. In a floor construction including support means, the improvement comprising a plurality of elongated similarly shaped floor members carried by said support means, each of said floor members including a planar uninterrupted load bearing surface and depending generally trough-shaped, oppositely facing walls, said walls terminating in lower planar flanges, said flanges and said oppositely facing trough-shaped walls being coextensive with and parallel to each other and coterminus with the length of a floor member, said floor members being so disposed with respect to each other that the trough-shaped walls of adjacent members define sinuous recesses therebetween, means including a channel-shaped clip element anchoring said members to the support means, said clip element being provided with inwardly turned lips which engage the top surfaces of the planar flanges on adjacent floor members and a web upon which the bottom surfaces of said flanges rest, generally flat surfaced wedge elements disposed within the recesses formed between adjacent floor members and below the level of the load bearing surfaces of said floor members such that said floor members will present unobstructed load bearing surfaces, said wedge elements also assuming the sinuous configuration of the recesses in which they are disposed, said wedge elements further engaging the trough-shaped walls of adjacent floor members and forcing the planar flanges thereof outwardly under the inwardly turned lips of said clip element so as to lock said floor members to said clip element in such a fashion that a fixed predetermined spacing is effected between the trough-shaped walls of adjacent floor members to permit the entrance of a cargo fastener in a recess between adjacent floor members and said wedge elements.

2. A floor construction as defined in claim 1 wherein each of said floor members includes an elongated support formed integrally therewith and positioned intermediate the walls thereof, said support also being coextensive with the length of the floor member and the bottom of said support lying in a plane below the plane of the planar flanges of the floor member.

References Cited in the file of this patent

UNITED STATES PATENTS

| | | |
|---|---|---|
| 1,998,310 | Dalton | Apr. 16, 1935 |
| 2,427,937 | Willson | Sept. 23, 1947 |

FOREIGN PATENTS

| | | |
|---|---|---|
| 643,921 | Great Britain | Sept. 27, 1950 |
| 497,937 | Canada | Nov. 24, 1953 |
| 294,607 | Switzerland | Feb. 1, 1954 |